United States Patent [19]
Heynderickx et al.

[11] Patent Number: 5,626,408
[45] Date of Patent: May 6, 1997

[54] ILLUMINATION SYSTEM FOR A COLOR PROJECTION DEVICE AND CIRCULAR POLARIZER SUITABLE FOR USE IN SUCH AN ILLUMINATION SYSTEM, AND COLOR IMAGE PROJECTION DEVICE COMPRISING SUCH AN ILLUMINATION SYSTEM AND CIRCULAR POLARIZER

[75] Inventors: Ingrid E. J. R. Heynderickx; Dirk J. Broer, both of Eindhoven, Netherlands

[73] Assignee: U.S. Philips Corporation, New York, N.Y.

[21] Appl. No.: 356,947

[22] Filed: Dec. 15, 1994

[30] Foreign Application Priority Data

Dec. 17, 1993 [BE] Belgium ............................ 09301412

[51] Int. Cl.$^6$ ..................................................... G03B 21/14
[52] U.S. Cl. ........................... 353/20; 359/495; 359/497
[58] Field of Search .............................. 353/31, 33, 34, 353/37, 20, 8, 38; 359/48, 49, 487, 488, 494, 495, 496, 497

[56] References Cited

U.S. PATENT DOCUMENTS

| | | | |
|---|---|---|---|
| 5,042,925 | 8/1991 | Broer et al. | 359/37 |
| 5,184,248 | 2/1993 | de Vaau et al. | 359/496 |
| 5,387,953 | 2/1995 | Minoura et al. | 353/20 |

FOREIGN PATENT DOCUMENTS

| | | | |
|---|---|---|---|
| 0266184 | 4/1988 | European Pat. Off. | |
| 0428213 | 5/1991 | European Pat. Off. | |
| 0467447 | 1/1992 | European Pat. Off. | |
| 0606940 | 10/1994 | European Pat. Off. | |
| 2272277 | 5/1994 | United Kingdom | 359/487 |

OTHER PUBLICATIONS

"New Liquid Crystal Polarized Color Projection Principle": by M. Schadt and J. Funfschilling in Japanese Journal of Applied Physics, vol. 29, No. 10, Oct. 1990, pp. 1974–1984.

"Retardation Film for STN–LCDs 'Nrf'" of the film of Nitto Denko in SID '92 Exhibit Guide, Society for Information Display, May 17–22, 1992, Boston, Mass.

"Principles of Optics" by M. Born and E. Wolf, 6th edition, Pergamon Press, pp.47–51, 615–618.

Search Report.

*Primary Examiner*—William Dowling
*Attorney, Agent, or Firm*—Walter M. Egbert

[57] ABSTRACT

The invention relates to an illumination system (7) for a colour image projection device (1). The illumination system (7) comprises a radiation source (3) for generating an unpolarized radiation beam (5) and at least a cholesteric mirror (9, 10, 11, 12, 13, 14) for wavelength-selective splitting of the radiation beam (5) into at least two sub-beams of different wavelengths. A composite circular polarizer (35) for directly converting the unpolarized radiation beam (5) into circularly polarized sub-beams jointly forming one beam is arranged in the path of the unpolarized radiation beam (5) between the radiation source (3) and the cholesteric mirror (9). The composite circular polarizer (35) comprises a polarization-sensitive beam splitter (43) which splits the unpolarized radiation beam (5) into two mutually perpendicularly and linearly polarized sub-beams, and a polarization converter (51, 53; 59, 61). The circularly polarized monochrome sub-beams are subsequently modulated, either or not after passage through λ/4 plate (63, 65, 67), by a corresponding number of image display panels (27, 29, 31) and projected as an image via a projection lens system (33).

27 Claims, 6 Drawing Sheets

ILLUMINATION SYSTEM FOR A COLOR PROJECTION DEVICE AND CIRCULAR POLARIZER SUITABLE FOR USE IN SUCH AN ILLUMINATION SYSTEM, AND COLOR IMAGE PROJECTION DEVICE COMPRISING SUCH AN ILLUMINATION SYSTEM AND CIRCULAR POLARIZER

BACKGROUND OF THE INVENTION

The invention relates to an illumination system for a colour image projection device, successively comprising a radiation source for supplying a radiation beam and at least a cholesteric mirror for splitting the radiation beam into at least two sub-beams having a different wavelength.

The invention also relates to a circular polarizer suitable for use in such an illumination system for directly converting unpolarized radiation into circularly polarized sub-beams.

The invention further relates to a colour image projection device comprising such an illumination system and a circular polarizer.

The term colour image projection device should be considered to have a wide meaning and may be used for a device for displaying a video image, a graphic image, numerical information or a combination thereof.

An illumination system suitable for use in a colour image projection device of the type described in the opening paragraph is known from the article "New Liquid Crystal Polarized Color Projection Principle" by M. Schadt and J. F ünfschilling in Japanese Journal of Applied Physics, vol. 29, no. 10, October 1990, pp. 1974–1984. The image display panels of the illumination system used in the known device are transmission panels having a layer of liquid crystalline material as an image-forming element. This layer modulates the state of polarization of incident radiation in conformity with the image information present therein. To this end the beam supplied by the illumination system should be linearly polarized in a given direction or should have a given direction of polarization rotation, dependent on whether the image display panel is suitable for modulating linearly or circularly polarized radiation. An image display panel is herein understood to mean the combination of the liquid crystalline layer with a polarizer and an analyser.

The illumination system described in the article makes use of cholesteric mirrors for splitting the "white" unpolarized radiation beam emitted by the radiation source into a plurality of "coloured" sub-beams in conformity with the number of image display panels and in a defined state of polarization. Thus, the cholesteric mirrors have a dual function, viz. colour selection and polarization selection.

A cholesteric mirror has an optical layer of liquid crystalline material with a spiral or helix-like structure having a pitch p. When a "white", unpolarized radiation beam is incident on such a mirror, a circularly polarized radiation component having a direction of rotation corresponding to the direction of rotation of the molecular helix and a wavelength adapted to the pitch p of the helix will be reflected, while a component having the opposite direction of rotation and/or a wavelength not adapted to the mirror will be passed.

In the known illumination system the colour separation and polarization is effected as follows. Unpolarized, white light is incident on a first cholesteric mirror which is oriented at an angle of 45° with respect to the beam. The blue, laevorotatory circularly polarized sub-beam is reflected towards a plane mirror. The direction of rotation is inverted on the mirror into a dextrorotatary direction so that the direction of rotation of this sub-beam is no longer adapted to the helix of the cholesteric mirror and consequently the sub-beam will be passed in the direction of the blue image display panel. The rest of the radiation beam is passed to a second cholesteric mirror which selects the blue, dextrorotatary circularly polarized radiation component and directly reflects it in the direction of the blue image display panel. Analogously, the green and the red sub-beam are selected by means of further cholesteric mirrors.

A drawback of the known illumination system is that the selectivity for laevorotatory and dextrorotatary circularly polarized radiation is not always sufficiently large, so that the efficiency of the conversion of unpolarized radiation into circularly polarized radiation is not optimal.

SUMMARY OF THE INVENTION

It is an object of the invention to provide an illumination system for a colour image projection device whose efficiency of converting unpolarized radiation emitted by the radiation source into circularly polarized radiation is optimal, which conversion can, moreover, be realised in a relatively simple and inexpensive manner.

To this end the illumination system according to the invention is characterized in that a composite circular polarizer for directly converting the unpolarized radiation into circularly polarized sub-beams is arranged in the path of the radiation beam between the radiation source and the cholesteric mirror, said polarizer comprising a polarization-sensitive beam splitter for splitting the radiation beam into two mutually perpendicularly and linearly polarized sub-beams, and a polarization converter, the circularly polarized sub-beams from the polarizer jointly forming one beam.

By making use of such a novel polarizer in an illumination system for a colour image projection device, in which the colour separation is realised by means of cholesteric mirrors, the radiation presented to the cholesteric mirrors is already circularly polarized without absorption of a part of the radiation emitted by the radiation source occurring. Moreover, this conversion is effected directly by means of a single component only and the conversion efficiency of unpolarized radiation into circularly polarized radiation is not dependent on the quality of the cholesteric mirrors. In this way the conversion efficiency of linearly polarized radiation into circularly polarized radiation is optimized so that the intensity of the radiation beam emitted by the radiation source can be utilized maximally. Moreover, it is now sufficient to use six cholesteric mirrors which are only half as large as the six cholesteric mirrors described in said article, so that their manufacture will be simpler and the cost price will be reduced considerably. Moreover, the plane mirrors can be dispensed with. There are two beam portions per colour, both in said article and in the present invention, which beam portions traverse different path lengths between the radiation source and the projection lens system. Since the plane mirrors are eliminated in the arrangement according to the invention, the path length difference between two beam portions of the same colour has become considerably smaller so that the illumination of the LCDs is improved.

An embodiment of the illumination system according to the invention is characterized in that the polarization-sensitive beam splitter comprises two transparent elements between which a polarization-separating layer is present, and in that the polarization converter comprises two λ/4 plates each being arranged in a diagonal position on a different exit face of the polarization-sensitive splitter.

A diagonal position is understood to mean that the axis of the λ/4 plate and the linear direction of polarization extend at an angle of 45° to each other.

A conventional λ/4 plate converts linearly polarized radiation into circularly polarized radiation, or conversely, but is wavelength-dependent. For this reason, use is made of a wideband or achromatic λ/4 plate. This is a transparent element which is composed of, for example a number of layers and realises such a phase rotation in a beam for all wavelengths in the visible wavelength range that linearly polarized radiation is converted into circularly polarized radiation, or conversely. It is to be noted that achromatic λ/4 plates are known per se from, for example the publication "Retardation Film for STN-LCDs 'NRF'" of the firm of Nitto Denko in SID '92 Exhibit Guide, Society for Information Display, May 17–22, 1992, Boston, Mass., USA.

The polarization-sensitive beam splitter splits the unpolarized radiation beam emitted by the radiation source into two mutually perpendicularly and linearly polarized sub-beams. Both sub-beams subsequently enter a λ/4 plate and are converted into circularly polarized beams. The λ/4 plates may be oriented in such a way that both sub-beams are circularly polarized in the same direction of rotation.

A preferred embodiment of the illumination system according to the invention is characterized in that the polarization-sensitive beam splitter comprises two transparent elements between which a polarization-separating layer of liquid crystalline material is present, whose molecules are oriented on said layer at an azimuth angle of substantially 45° to the plane of incidence and at a tilt angle which is equal to the angle of incidence α of the unpolarized radiation beam, and in that the polarization converter comprises a third and a fourth transparent element each for guiding a linearly polarized sub-beam supplied by the beam splitter and each having at least a reflection face on which a phase shift occurs upon reflection of the relevant sub-beam between the sub-beam component having a direction of polarization parallel to the plane of incidence and the sub-beam component having a direction of polarization perpendicular to the plane of incidence, the total phase shift in both the third and the fourth element being 90°.

In optical systems it is known that upon total internal reflection of a radiation beam there is a relative phase shift between the component of the beam having a direction of polarization parallel to the plane of incidence of the beam and the beam component perpendicular to the plane of incidence of the beam. The relative phase shift $\delta=\delta_\parallel-\delta_\perp$ which occurs is known to be defined by $$tg\frac{\delta}{2} = \frac{\cos\theta_i \sqrt{\sin^2\theta_i - n^2}}{\sin^2\theta_i}$$

in which n is the relative refractive index on the interface between the optical volatile and the optical dense medium and $\theta_i$ is the angle of incidence. By orienting the molecules of the polarization-separating layer in the beam splitter in such a way that the direction of polarization of the linearly polarized sub-beams supplied by the beam splitter extends at an angle of 45° to the plane of incidence of this linearly polarized beam, the amplitudes of the polarization components parallel and perpendicular to this plane of incidence will be equal to each other. Moreover, the desired phase shift of 90° between the two polarization components required to convert linearly polarized light into circularly polarized light can be realised by means of the given formula by adapting the relative refractive index n and the angle of incidence $\theta_i$. At least two total internal reflections are necessary for this purpose.

A further embodiment of the illumination system according to the invention is characterized in that the third and the fourth element are Fresnel prisms each having a first reflection face and a second reflection face enclosing an angle $\beta_1$ and an angle $\beta_2$, respectively, with the polarization-separating layer, while it holds that:

$$tg\frac{\delta_1}{2} = \frac{\cos\theta_{i,1} \sqrt{\sin^2\theta_{i,1} - n^2}}{\sin^2\theta_{i,1}}$$

$$tg\frac{\delta_2}{2} = \frac{\cos\theta_{i,2} \sqrt{\sin^2\theta_{i,2} - n^2}}{\sin^2\theta_{i,2}}$$

with $\delta_1$ and $\delta_2$ being the phase shifts between the component having a direction of polarization parallel to the plane of incidence and the component having a direction of polarization perpendicular to the plane of incidence of the linearly polarized sub-beam entering the third and the fourth element, respectively, due to the total internal reflections on the respective reflection faces, n being the relative refractive index of the Fresnel prisms, $\theta_{i,1}=\alpha-\beta_1$ being the angle of incidence for the first total internal reflection and $\theta_{i,2}=\alpha-2\beta_1-\beta_2$ being the angle of incidence for the second total internal reflection, α being the angle of incidence of the unpolarized radiation beam on the polarization-separating layer of the beam splitter.

In a Fresnel prism the incident beam is successively subject to two total internal reflections, while a relative phase shift of 90° is caused between the polarization component parallel to the plane of incidence and the polarization component perpendicular to the plane of incidence. At the first reflection, the linearly polarized beam is elliptically polarized and at the second reflection the elliptically polarized beam is converted into a circularly polarized beam, provided that the amplitudes of both components of the incident beam are equal to each other. However, in order that this conversion could take place, the refractive index ratio n of the polarizer and the angle of incidence $\theta_i$ of the radiation beam to be converted should satisfy the above-mentioned relation.

The present invention proposes to combine a known beam splitter converting unpolarized radiation into linearly polarized radiation with Fresnel prisms in an illumination system for a colour image projection device, such that unpolarized radiation can be directly converted into circularly polarized radiation with the aid of a single element which, moreover, is achromatic in a relatively large wavelength range. To this end, however, the shapes of the Fresnel prisms and the beam splitter are to be adapted to each other.

It is to be noted that Fresnel prisms are known per se for converting linearly polarized radiation into circularly polarized radiation, inter alia from the book "Principles of Optics" by M. Born and E. Wolf, 6th edition, Pergamon Press, pp. 47–51.

An embodiment of the illumination system according to the invention is characterized in that the first and the second transparent element are each integrated with a Fresnel prism to a single element.

By combining the Fresnel prisms with the beam splitter, the direct conversion of linearly polarized radiation into circularly polarized radiation is effected by means of a single element. This leads to a considerable simplification of the construction of the polarizer.

An alternative embodiment of the illumination system according to the invention is characterized in that at least the third or the fourth element has a reflecting layer on at least a reflection face.

A wavelength-independent phase shift of 90° between the polarization component parallel to the plane of incidence and the polarization component perpendicular to the plane of incidence may also be raised by a single reflection of one of the linearly polarized sub-beams on a metallic mirror. The realisation of a given phase shift by means of a reflection on a metallic layer is known per se and is described, for example in the afore-mentioned book "Principles of Optics", pp. 615–618. In this way, the number of reflections can be reduced considerably.

In the embodiments hitherto described of the illumination system according to the invention there are still two cholesteric mirrors required for each colour to be separated so as to raise total conversion into radiation which is suitably polarized to be modulated by the image display panels. This results in a relatively large number of separate components which, moreover, are to be aligned with one another so as to obtain a conversion which is as efficient as possible.

An embodiment of the illumination system according to the invention is, however, characterized in that one of the exit faces of the polarizer is provided with a polarization-rotating element.

In the known illumination system the beam circularly polarized by the polarizer is partly dextrorotatary and partly laevorotatory circularly polarized. By providing one of the exit faces of the polarizer with a polarization-rotating element rotating the direction of polarization of the relevant sub-beam through 180° with respect to the direction of polarization of the other sub-beam, both sub-beams will be circularly polarized with the same direction of rotation when they leave the polarizer. This has the advantage that only three cholesteric mirrors are sufficient in the illumination system.

There are different possibilities of polarization-rotating elements. To this end, a first embodiment of the colour image projection device according to the invention is characterized in that the polarization-rotating element is a $\lambda/2$ plate.

A $\lambda/2$ plate is known per se as a polarization-rotating element.

An alternative embodiment of the colour image projection device according to the invention is characterized in that the polarization-rotating element is a double Fresnel prism.

A double Fresnel prism is to be understood to mean a prism in which successively four total internal reflections occur.

By passing one of the circularly polarized sub-beams through such a prism, a phase shift of 180° will be reached so that the direction of rotation of the relevant sub-beam is now equal to the direction of rotation of the other circularly polarized sub-beam.

BRIEF DESCRIPTION OF THE DRAWING

These and other aspects of the invention will be apparent from and elucidated with reference to the embodiments described hereinafter.

In the drawings

DETAILED DESCRIPTION OF THE INVENTION

Figure 1:
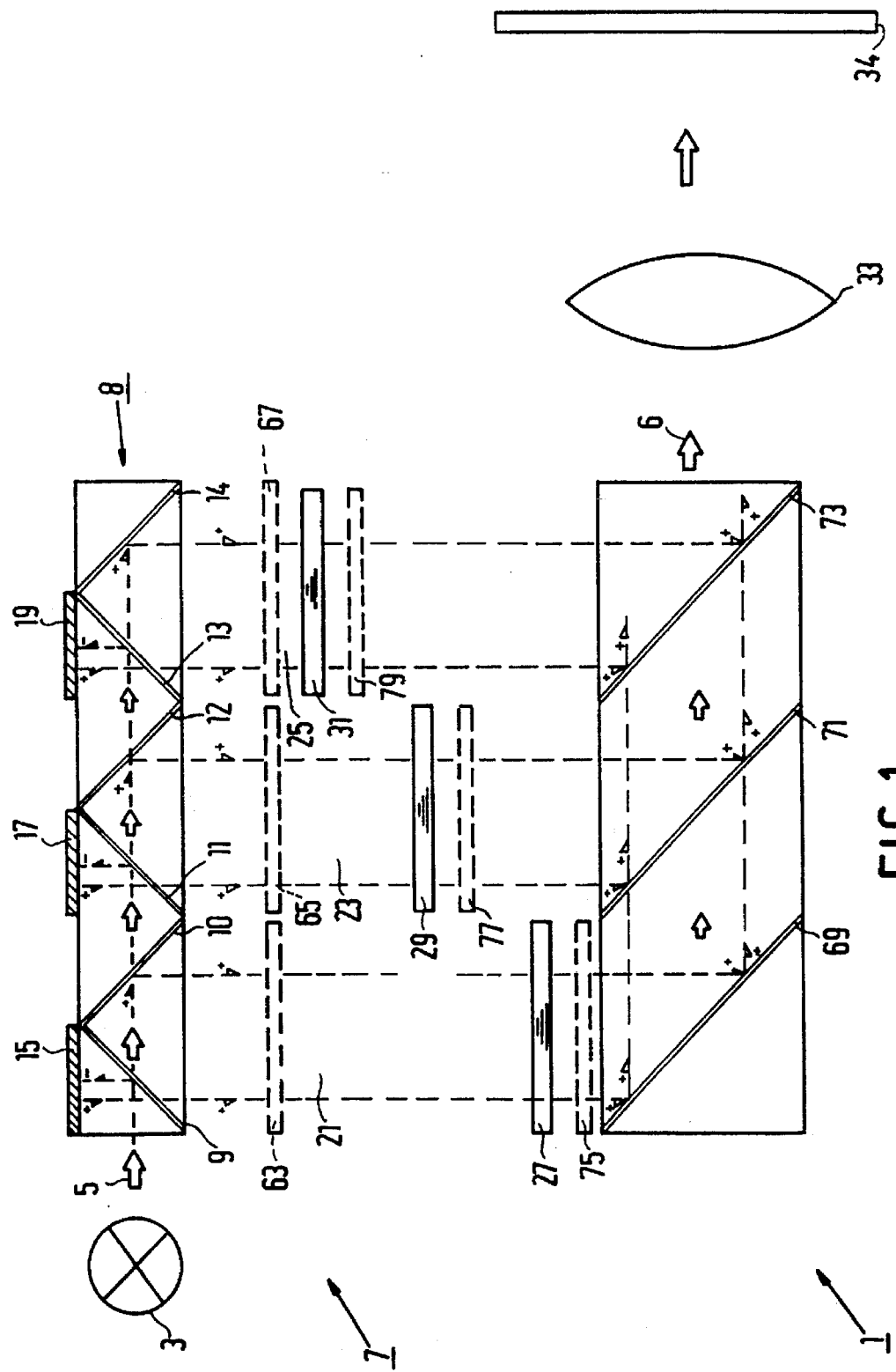
FIG. 1 shows diagrammatically an embodiment of a colour image projection device in accordance with the prior art.

The invention will now be described in greater detail by reference to the figures of the drawing.

The colour image projection device 1 shown diagrammatically in FIG. 1 comprises an illumination system 7 which consists of a radiation source 3, a mirror system 8 and three image display panels 27, 29 and 31, one for each of the primary colours red, blue and green. Each image display panel is, for example a liquid crystal display panel, further referred to as LCD panel in combination with a polarizer and an analyser. An LCD panel has a layer of liquid crystalline material which is enclosed between two transparent plates and which layer is divided into pixels. The panel may be driven both actively and passively. Both types of direct-drive image display panels are described, for example in European Patent Application EP 0 266 184. By driving a pixel, by applying a local electric field, a change of the effective refractive index of the liquid crystalline material is caused at the location of this pixel so that the radiation passing through this pixel undergoes a change of direction of polarization. By driving or not driving the pixels of the panel in accordance with a given pattern defined by the information presented, a "polarization image" is formed which is converted into a visible image by the analyser.

The radiation incident on the image display panels should thus be polarized. There are both image display panels modulating linearly polarized radiation and panels modulating circularly polarized radiation, dependent on the choice of the polarizer and the analyser. However, the radiation source supplies unpolarized radiation which should consequently be converted into radiation having the desired state of polarization before they are incident on the image display panels. To this end the illumination system shown in FIG. 1 and known from the article by M. Schadt and J. Fünfschilling comprises cholesteric mirrors. A cholesteric mirror has an optical layer of liquid crystalline polymer material with a spiral or helix-like structure having a pitch p. When a "white", unpolarized radiation beam is incident on such a mirror, a circularly polarized radiation component having a direction of rotation corresponding to the direction of rotation of the molecular helix and a wavelength adapted to the pitch p of the helix will be reflected, while a component having the opposite direction of rotation and/or a wavelength not adapted to the mirror will be passed.

The known illumination system 7 is constituted by a radiation source 3, which emits a white, unpolarized radiation beam 5, and also by a series of, for example six cholesteric mirrors 9, 10, 11, 12, 13, 14 and three plane mirrors 15, 17, 19 for splitting the radiation beam 5 into, for example three coloured sub-beams 21, 23, 25 in conformity with the number of image display panels 27, 29, 31.

In the known illumination system the colour separation and polarization are effected as follows. Unpolarized, white light is incident on the first cholesteric mirror 9 which is positioned at an angle of 45° with respect to the beam 5. The blue, laevorotatory circularly polarized sub-beam $b_{b,1}$ is reflected towards a plane mirror 15. The direction of polarization is inverted on the mirror 15 into dextrorotatary rotation, so that the direction of rotation of this beam is no longer adapted to that of the helix of the cholesteric mirror 9 and this beam will consequently be passed in the direction of the blue image display panel 27. The rest of the radiation beam is passed to a second cholesteric mirror 10 which selects the blue, dextrorotatary radiation component $b_{b,r}$ and reflects it directly towards the blue image display panel 27. Analogously, the green sub-beams $b_{g,r}$, $b_{g,1}$ and the red sub-beams $b_{r,r}$ and $b_{r,1}$ are selected. Here, the cholesteric mirrors thus have a dual function: colour separation and polarization. The mirror may be made suitable for polarizing within a given wavelength band by adapting the width and the position of the reflection band of the mirror.

The known cholesteric mirrors are effective as polarizers within a limited wavelength band, for example 50 nm. Radiation having a wavelength outside this wavelength band is passed. The wavelength bandwidth of the full visible light range is approximately 380 nm, which means that a width of, for example 100 to 150 nm per colour is very suitable for a colour image projection system.

The width of the reflection wavelength band $\Delta\lambda$ of the mirror is given by $\Delta\lambda=\lambda_0\Delta n/\bar{n}$, in which $\Delta n=n_e-n_o$ is the birefringence, in which $n_e$ and $n_o$ are the extraordinary and ordinary refractive indices of the cholesteric material and $\bar{n}=(n_e+n_0)/2$ is the average refractive index. $\lambda_0$ is the central wavelength of the selective reflection wavelength band upon perpendicular incidence of the radiation and is given by $$\lambda_0 = \bar{n}p = \frac{(n_e + n_0)}{2} p,$$

in which p is the pitch of the molecular helix of the mirror.

However, since the shift of the reflection wavelength band as a function of the angle of incidence is, for example 2 nm per degree, a wider reflection wavelength band than is necessary for widely covering the full visible wavelength range of 380 nm should be taken into account when manufacturing the mirror.

By using a layer of a polymer as a liquid crystalline layer, the pitch p of the molecular helix can be varied across the relevant layer so that the wavelength band can be widened. A method of manufacturing such a mirror is described extensively in the non-prepublished European Patent Application no. 93203057.0 (PHN 14.629).

By widening the reflection band per mirror, the total light intensity can be increased because the three mirrors can now jointly cover the wavelength band required for the visible wavelength range.

A drawback of the current cholesteric mirrors is that the selectivity between laevorotatory and dextrorotatary circularly polarized light is, however, not optimal yet. For this reason, the present invention proposes to convert the unpolarized radiation beam 5 emitted by the radiation source 3 into circularly polarized radiation before presenting it to the cholesteric mirrors. This conversion is realised by means of a novel, composite circular polarizer.

The beams modulated by the image display panels 27, 29 and 31 are subsequently combined by one set of three cholesteric mirrors 69, 71 and 73 to one beam 6 which is incident on the projection lens system 33. For the sake of simplicity, the projection lens system 33 is represented by a single lens. The image is projected on a projection screen 34.

The advantage of making use of cholesteric mirrors for the colour separation instead of making use of dichroic mirrors is that cholesteric mirrors can be made in a single layer, which is simpler and less expensive. Dichroic mirrors are composed of a plurality of consecutive thin layers having different refractive indices, which render such mirrors relatively expensive from a technological point of view.

The radiation beams coming from the cholesteric mirrors are thus circularly polarized. Then image display panels 27, 29 and 31 which are suitable for modulating circularly polarized radiation can be used. However, if the polarizer and the analyser of the image display panels 27, 29 and 31 are adapted to modulate linearly polarized radiation, a λ/4 plate 63, 65, 67 is to be arranged in each sub-beam between the relevant cholesteric mirror and the image display panel so as to convert the circularly polarized radiation into linearly polarized radiation. Before the sub-beams modulated by the image display panels 27, 29 and 31 can be combined by the cholesteric mirrors 69, 61 and 73 to one beam 6, the sub-beams should first be converted into circularly polarized beams by a second set of λ/4 plates 75, 77 and 79. The λ/4 plates are shown each time in broken lines because they may be dispensed with if the image display panels modulate circularly polarized radiation.

Figure 2:
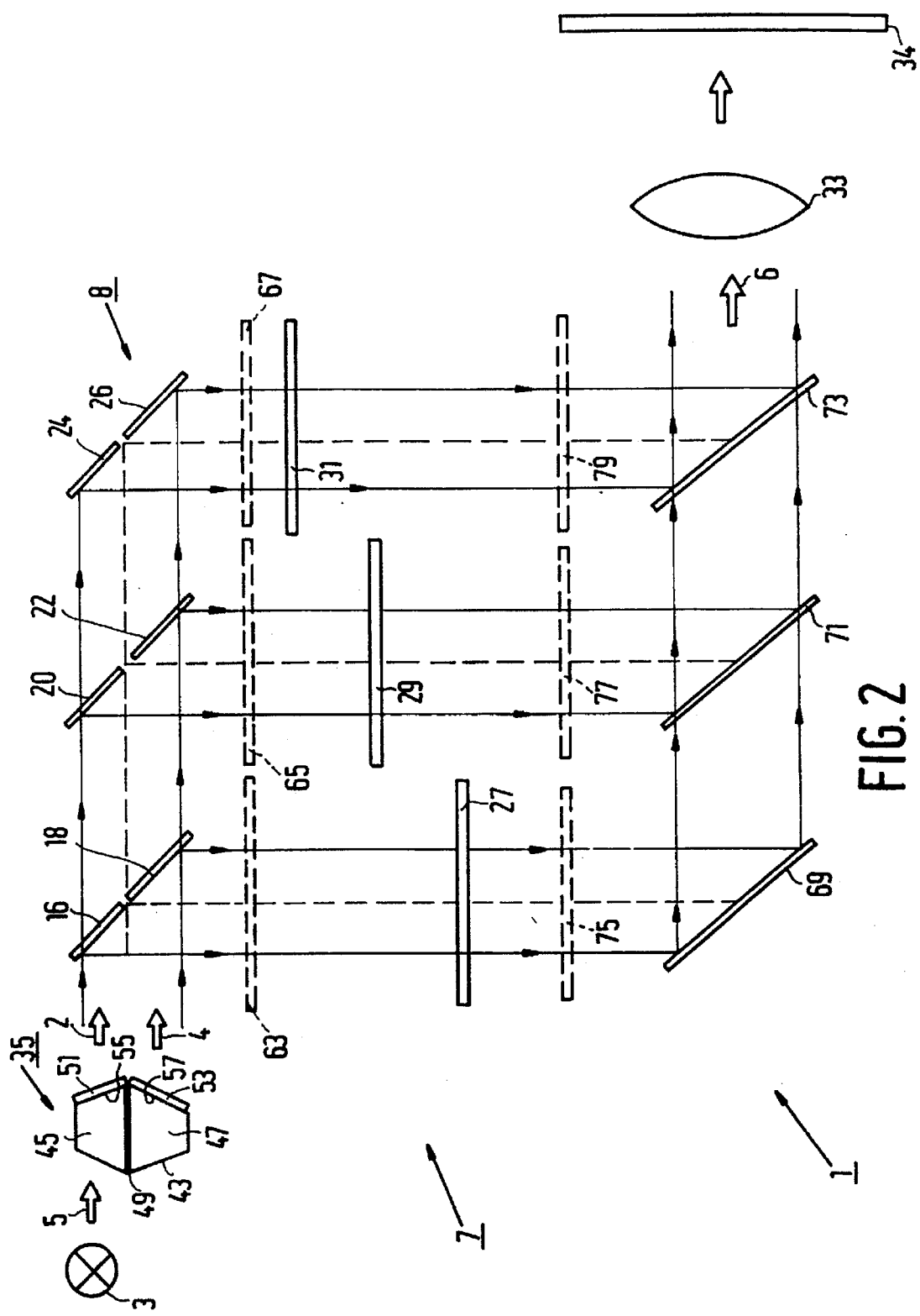
FIG. 2 shows diagrammatically an embodiment of a colour image projection device according to the invention.

FIG. 2 shows diagrammatically an embodiment of a colour image projection device according to the invention. A composite circular polarizer 35 converting the unpolarized radiation beam 5 from the radiation source 3 directly into circularly polarized radiation is arranged in front of a set of six relatively small cholesteric mirrors 16, 18, 20, 22, 24 and 26 which jointly constitute the mirror system 8. Since circularly polarized light is now already presented to the cholesteric mirrors, it is sufficient to use two relatively small cholesteric mirrors per colour, one for each direction of rotation, and the plane mirrors can be dispensed with. Such small cholesteric mirrors can be made in a relatively inexpensive and simple manner.

Figure 3:
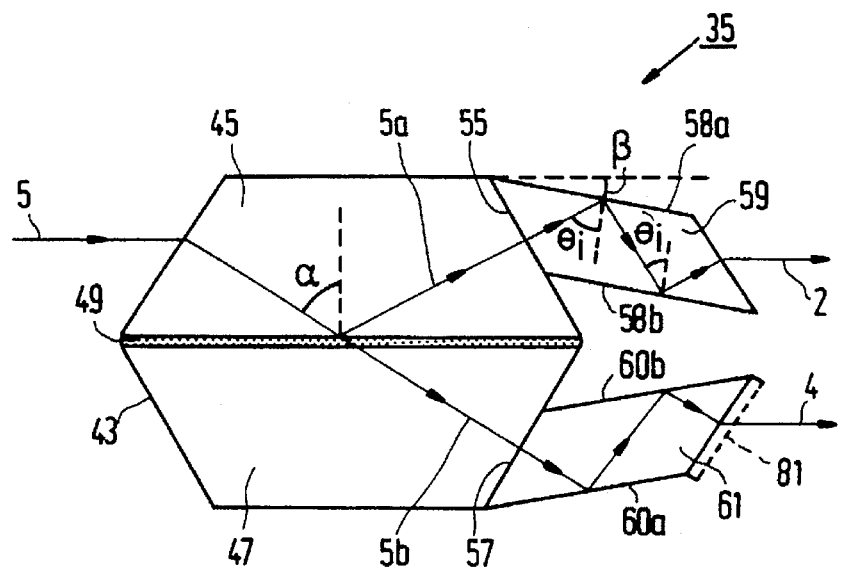
FIG. 3 shows a first embodiment of a composite circular polarizer for use in an illumination system for a colour image projection device according to the invention.

FIG. 3 shows in detail an embodiment of the composite circular polarizer 35. The polarizer 35 comprises a beam splitter 43 which converts the unpolarized radiation from the radiation source 3 into two mutually perpendicularly and linearly polarized radiation beams. Such a polarization-sensitive beam splitter is known per se from U.S. Pat. No. 5,042,925 in the name of the Applicant. The beam splitter 43 comprises two glass prisms 45 and 47 enclosing a layer 49 of birefringent material whose extraordinary refractive index is equal to the refractive index of the material of the prisms. The ordinary refractive index of the birefringent layer 49 is smaller than the extraordinary refractive index, hence also smaller than that of the prisms.

An incoming light ray 5 is split into an extraordinary light ray 5b which, in accordance with the embodiment, goes straight on, and into an ordinary light ray 5a which is totally reflected on the interface with the polarization-separating layer 49. The light rays 5a and 5b are linearly polarized in mutually perpendicular directions. In contrast to polarizers based on absorption of one of the chief light rays, there is no loss of light. It is also important that the polarization-sensitive beam splitter 43 is not heated due to such absorption.

Suitable birefringent glue compounds are liquid crystalline acrylic resins, epoxides and vinyl ethers as described, for example in Netherlands Patent Application NL 8802683. Particularly, lattice-forming monomer compositions are suitable, for example diacrylic resins as described in said United States Patent. For further information regarding this beam splitter, reference is made to said Patent.

In the present invention the beam splitter 43 is extended to a circular polarizer so that there is direct conversion of unpolarized radiation into circularly polarized radiation. To realise this, a transparent element 51 and 53 converting a linearly polarized sub-beam into a circularly polarized sub-beam is associated with each prism 45 and 47. In this way, the circular polarizer 35 directly converts the unpolarized radiation beam 5 of the radiation source 3 into two circularly polarized sub-beams 2 and 4 which jointly form a beam. In FIG. 2, the transparent elements are shown as λ/4 plates each being arranged on exit faces 55 and 57 of the beam splitter 43 and directed towards the mirror system 8. A λ/4 plate is a transparent element which is composed of, for example a plurality of layers jointly realising a phase shift in a beam for all wavelengths in the visible wavelength range so that linearly polarized radiation is converted into circularly polarized radiation, or conversely. A conventional λ/4 plate converts linearly polarized radiation into circularly polarized radiation, or conversely, but is wavelength-dependent. For this reason, use is made of wideband λ/4 plates. Achromatic or wideband λ/4 plates are known, for example from the publication: "Retardation Film for STN-LCDs 'NRF'" of the firm of Nitto Denko in SID 92 Exhibit Guide, Society for Information Display, May 17–22, 1992, Boston, Mass., USA. The λ/4 plates 51 and 53 may be oriented in such a way that the two sub-beams 2 and 4 are circularly polarized with the same direction of rotation.

However, Fresnel prisms are preferably used for the transparent elements 51 and 53. These elements provide the possibility of realising a wavelength-independent conversion of polarization in an inexpensive manner.

FIG. 3 shows a first embodiment of a composite circular polarizer 35 in which the transparent elements are Fresnel prisms 59 and 61. For the sake of clarity, only the chief rays of the entering beam 5, the sub-beams 5a and 5b and the exiting sub-beams 2 and 4 are shown.

A Fresnel prism is a known element and is described extensively, for example in the book "Principles of Optics" by M. Born and E. Wolf, 6$^{th}$ edition, Pergamon Press, pp. 47–51. A Fresnel prism is understood to mean a prism in which a beam successively undergoes two total internal reflections. If the direction of polarization of the beam extends at an angle of 45° to the plane of incidence of the beam at the area of the first reflecting prism face 58a, 60a, and at a given angle of incidence of this beam on this prism face, the two successive reflections jointly produce a phase shift of 90° between the components of the incident beam having a direction of polarization perpendicular and parallel, respectively, to said plane of incidence. This plane is the plane of the drawing in FIG. 3.

Such a phase shift involves conversion of linearly polarized radiation into circularly polarized radiation. The phase shift δ occurring per reflection is given by:

$$tg\frac{\delta}{2} = \frac{\cos\theta_i \sqrt{\sin^2\theta_i - n^2}}{\sin^2\theta_i}$$

with $n = n_2/n_1$ in which $n_2$ is the refractive index of the medium surrounding the prism and $n_1$ is the refractive index of the prism. The angle $\theta_i$ can be subsequently defined from the condition that a phase shift of 45° occurs per reflection and from the refractive indices $n_1$ and $n_2$. $\theta_i$ is the angle of incidence of the linearly polarized sub-beams generated by the beam splitter 43 on the prism-air interface 58a or 60a.

Figure 4:
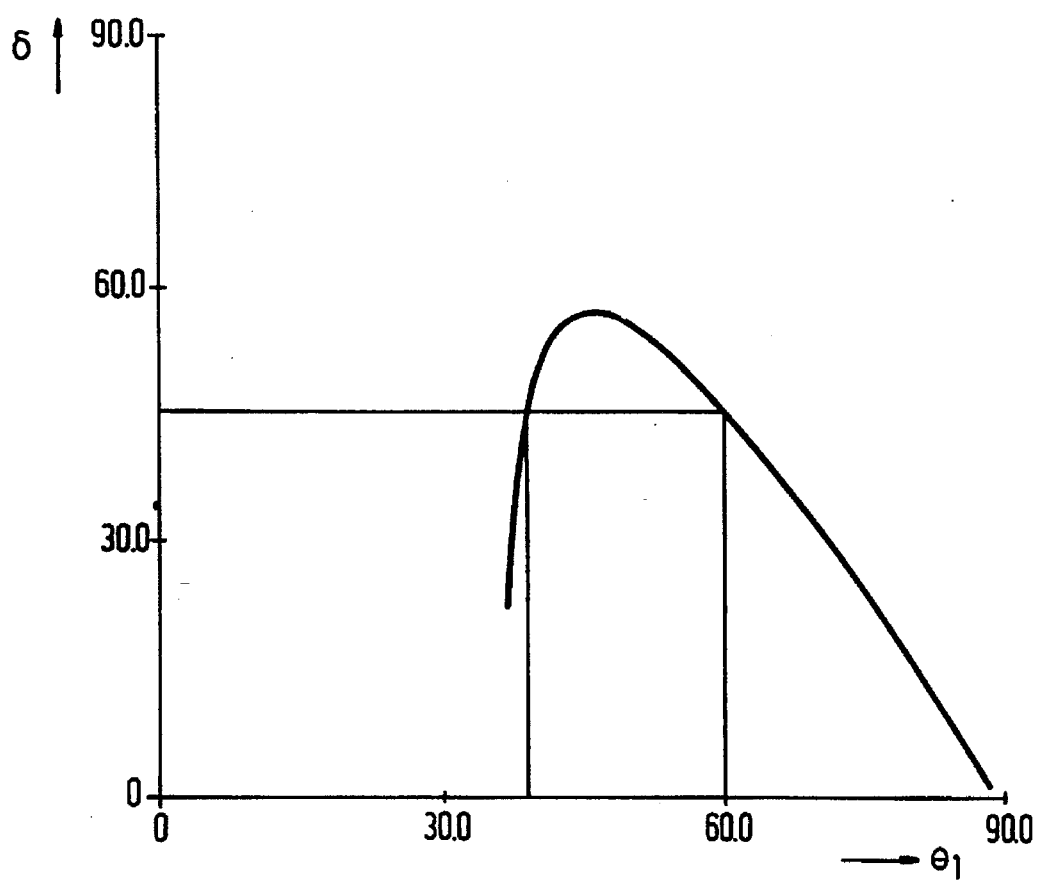
FIG. 4 shows the phase shift between the component perpendicular to and the component parallel to the normal perpendicular to the plane of incidence of the radiation beam as a function of the angle of incidence of the linearly polarized sub-beam on the air-prism interface.

FIG. 4 shows for the prism in air, $n_2=1$, the phase shift δ as a function of the angle of incidence $\theta_i$. It is evident from the Figure that, for example for a prism having a refractive index $n_1=1.7$ the desired phase shift of 45° can be obtained for two values of the angle of incidence viz. $\theta_i=39.2°$ and $\theta_i=60.5°$.

The direction of polarization of the linearly polarized sub-beams 5a, 5b is to extend at an angle of 45° to their plane of incidence at the area of the reflecting faces 58a and 60a. This can be realised by orienting the molecules of the liquid crystalline layer 49 in the separating layer in such a way that they extend at an azimuth angle of 45° to the plane of incidence of the beam 5 and have a tilt angle which is equal to the angle of incidence α of the radiation beam 5 on the birefringent layer 49. The molecules can be oriented in this way by providing an orientation layer, for example on the surfaces of the prisms which are in contact with the birefringent layer 49. The surfaces are rubbed with a cloth whereafter the molecules of the birefringent layer are oriented in the rubbing direction. If desired, the orientation may alternatively be obtained by placing the assembly of prisms in a magnetic field. Light which is polarized in a direction parallel to the molecules does not see any refraction, whereas light having a direction of polarization perpendicular to the direction of the molecules undergoes total reflection. In order that the sub-beams linearly polarized by the beam splitter 43 are incident at the angle $\theta_i$ on an air-prism interface, the reflection faces of the Fresnel prisms should be positioned at a given angle with respect to the birefringent layer in view of the feasible values of refractive indices. This angle is defined by $\beta = \alpha - \theta_1$, in which α is the angle of incidence on the birefringent layer and is defined by the refractive index of the material of the beam splitter 43.

The polarizer 35 thus directly converts the unpolarized radiation beam 5 of the radiation source 3 into a laevorotatory and a dextrorotatary circularly polarized sub-beam 2 and 4 which jointly form one beam. In this way, the efficiency of the conversion of unpolarized radiation into circularly polarized radiation can be considerably increased and the intensity of the radiation source is utilized to an optimal extent. As already stated, it is sufficient to use six relatively small cholesteric mirrors. Moreover, the difference in path length between the oppositely circularly polarized sub-beams 2 and 4, measured between the radiation source 3 and the projection lens system 33, is reduced so that the LCDs are illuminated more evenly.

As regards shape, the circular polarizer shown in FIG. 3 may be further optimized. The circular polarizer 35 preferably comprises a minimum number of separate blocks. To this end, the angles of incidence α and $\theta_i$ should be adapted to each other. The angle α can be varied by the material choice of both the prisms 45, 47 and the birefringent layer 49. The angle $\theta_i$ can be adapted by adapting the form of the refractive index of the Fresnel prisms. In the latter case the critical angle for critical reflection, hence the value of α is also influenced.

The following numerical example is given by way of illustration. If the ratio between the ordinary refractive index of the separating layer 49 and the refractive index of the prism 45 is 0.87, a critical reflection occurs at an angle of incidence α of 67°. This means that the ordinary linearly polarized sub-beam leaves the birefringent layer at an angle of 67°, while the extraordinary linearly polarized sub-beam should not see any difference in refractive index and enters the other prism at a right angle through the layer 49. This means that the birefringent material should be chosen to be such that $n_o/n_e$ is also 0.87. Since the ordinary refractive index is about 1.52 for most liquid crystalline materials, not only the extraordinary refractive index $n_e$ of the liquid crystalline material but also the refractive index of the material of the prisms should be approximately 1.75.

However, it is not necessary to realise the total phase shift of 90° by means of two reflections causing the same phase shift. The two reflections may alternatively cause two different phase shifts jointly yielding a total phase shift of 90°. This is, for example the case in the embodiments of the composite circular polarizer, shown in FIGS. 5a and 5b. The geometry is defined by the requirement that the angle β for a given angle of incidence α should be chosen to be such that it holds for the internal reflections at the angles $\theta_{i,1}$ and $\theta_{i,2}$ that:

$$tg\frac{\delta_1}{2} = \frac{\cos\theta_{i,1}\sqrt{\sin^2\theta_{i,1} - n^2}}{\sin^2\theta_{i,1}}$$

with $\theta_{i,1} = \alpha - \beta$ $$tg\frac{\delta_2}{2} = \frac{\cos\theta_{i,2}\sqrt{\sin^2\theta_{i,2} - n^2}}{\sin^2\theta_{i,2}}$$

with $\theta_{i,2}=\theta_{i,1}-\beta=\alpha-2\beta$ and with $\delta_1+\delta_2=90°$.

Figure 5A:
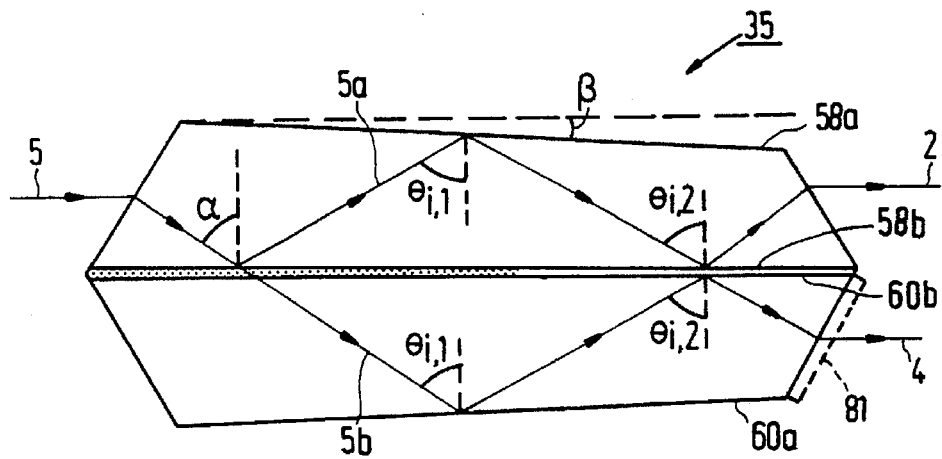
FIGS. 5a and 5b show two embodiments of a composite circular polarizer according to the invention, in which a phase shift of 90° is obtained by means of two different reflections.

For the circular polarizer of FIG. 5a it holds that the angle β will be 4.45° for an angle of incidence α of 67°. The first internal reflection at an angle $\theta_{i,1}=62.55°$ yields a phase shift of 42°, while the second internal reflection at an angle of $\theta_{i,2}=58.1°$ yields a phase shift of 48°.

Figure 5B:
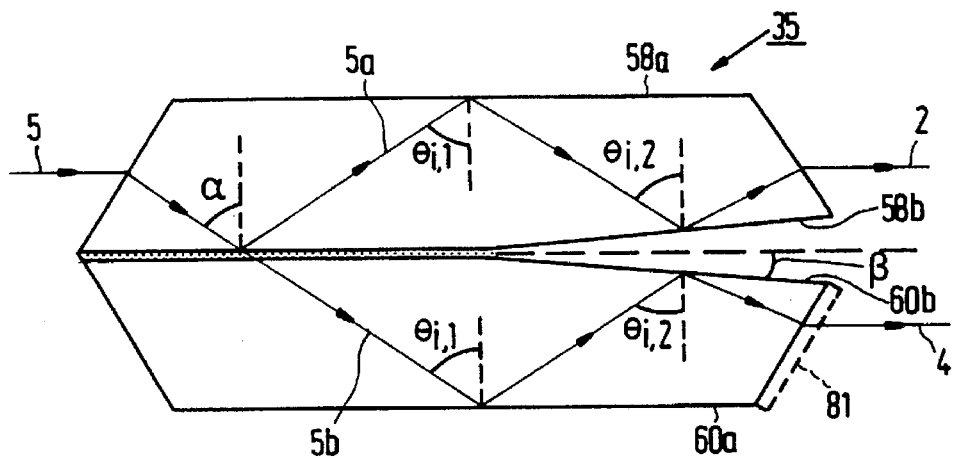

For the circular polarizer of FIG. 5b it holds that for an angle of incidence α=67° two values are possible for the angle β, viz. 15.0° and 24.8°. For the first internal reflection $\theta_{i,1}=\alpha$ yields a phase shift of 35.9°. The remaining phase shift of 54.1° is obtained by a second internal reflection at an angle $\theta_{i,2}=52°$ or 42.2°. The graph of FIG. 4 shows that an angle of 42.2° is the best choice for wavelength dependence and dependence of the angle of incidence.

Alternatively, a slope with respect to the birefringent layer 49 can be given on the first reflection face 58a, 60a of the polarizer 35 and on the second reflection face 58b, 60b of the polarizer, so that the angle β is divided across the two faces.

Figure 6:
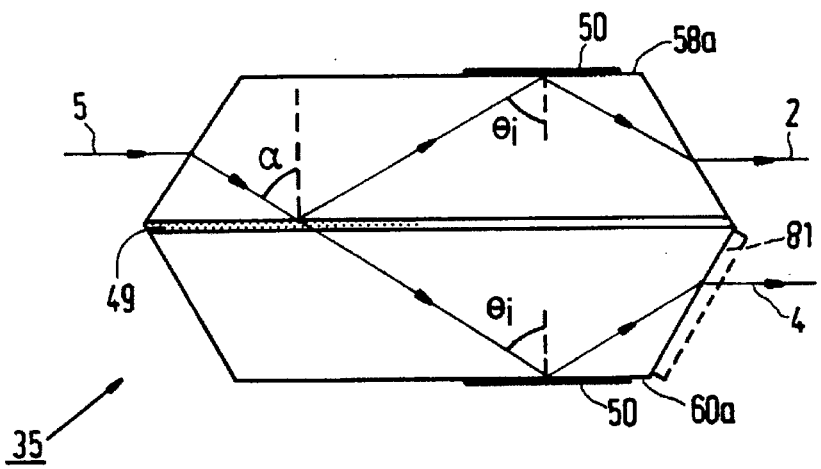
FIG. 6 shows an embodiment of a composite circular polarizer according to the invention which is at least partly provided with a metallic layer.

FIG. 6 shows another embodiment of a composite circular polarizer according to the invention. In this circular polarizer, each polarization converter has only one reflection face in the form of a specularly reflecting face. A specularly reflecting face can be obtained by at least partly providing, for example one of the surfaces of the polarizer with a metallic layer 50. It is known per se, for example from the book "Principles of Optics" by M. Born and E. Wolf, pp. 615–618 that a phase shift of 90° can be realised by specular reflection on a reflecting surface between the polarization component perpendicular to the plane of incidence of the incident radiation beam and the polarization component parallel to this plane of incidence, provided that $\theta_i$ is adapted to the refractive indices of the prism and the metallic layer. $\theta_i$ may be adapted by causing, for example the reflection faces 58a and 60a to enclose an angle β with the polarization-separating layer 49. In this way, the number of reflections is reduced and consequently, the circular polarizer may be given a more compact design.

Figure 7:
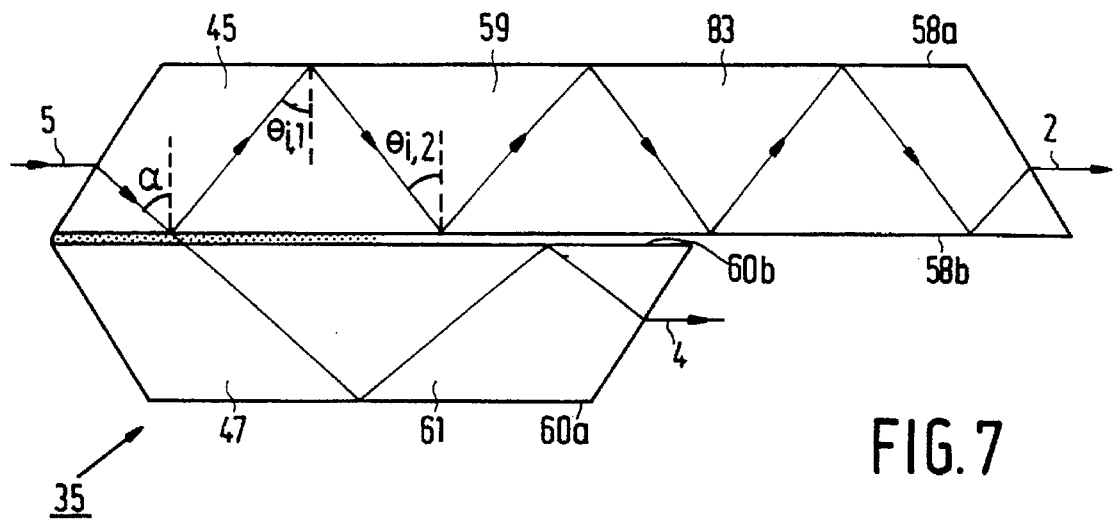
FIGS. 7 and 8 show two embodiments of a composite circular polarizer according to the invention supplying two sub-beams having the same circular direction of polarization rotation.
Figure 8:
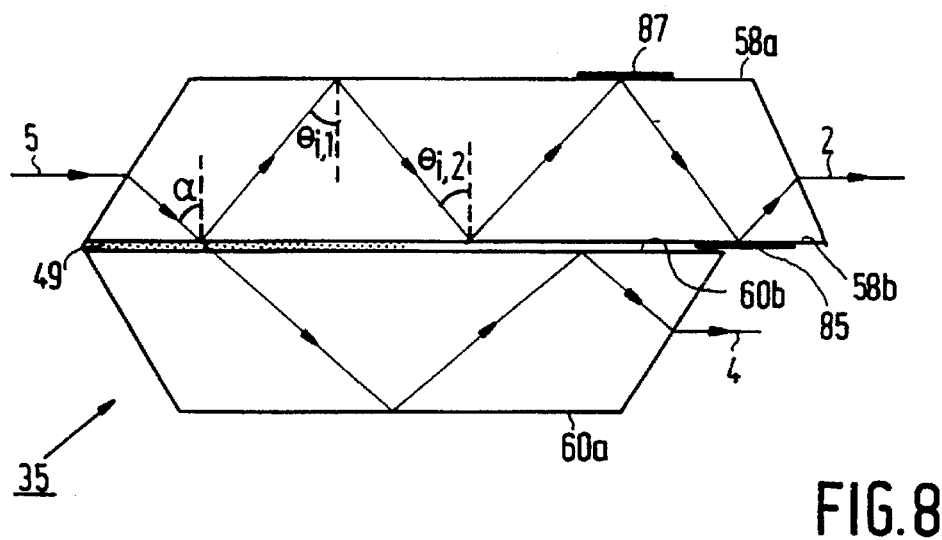

As described so far, the composite circular polarizer with Fresnel prisms yields a beam substantially half of which is laevorotatory circularly polarized and substantially the other half of which is dextrorotatary circularly polarized. Both sub-beams may be circularly polarized in the same direction of rotation by causing a phase shift of 180° in one of the two sub-beams between the polarization component perpendicular to the plane of incidence of the relevant sub-beam and the polarization component parallel to the plane of incidence of the relevant sub-beam. This is possible by providing an additional, optical delay plate or λ/2 plate on one of the exit faces of the circular polarizer. FIGS. 3, 5a, 5b and 6 show a λ/2 plate 81 in broken lines. Another possibility is to lengthen one of the two Fresnel prisms by means of a double Fresnel prism 83 in which four internal reflections occur on reflection faces 58a, 58b and thus jointly cause a phase shift of 180°. FIG. 7 shows an embodiment. The two sub-beams 2 and 4 are now circularly polarized in the same direction of rotation. The resultant asymmetry of the circular polarizer may at least partially be compensated by choosing a material having a different refractive index for the longer prism 45, 59, 83 or for a part thereof. Another possibility, in which the asymmetry of the polarizer is compensated, is to combine a difference in refractive index of one of the prism portions of the polarizer 35 with metallic layers 85, 87 provided on the reflecting surfaces 58a, 58b. An embodiment of a circular polarizer, in which this is the case, is shown in FIG. 8. A total internal reflection on an air-prism interface 58a, 58b, 60a, 60b produces, for example a phase shift of 45°. The reflections on the metallic layers produce a phase shift of 90° each. In this way, a phase shift of 180° is produced between the two sub-beams 2 and 4 as shown in FIG. 8, which means that the two sub-beams are circularly polarized in the same direction of rotation.

Figure 9:
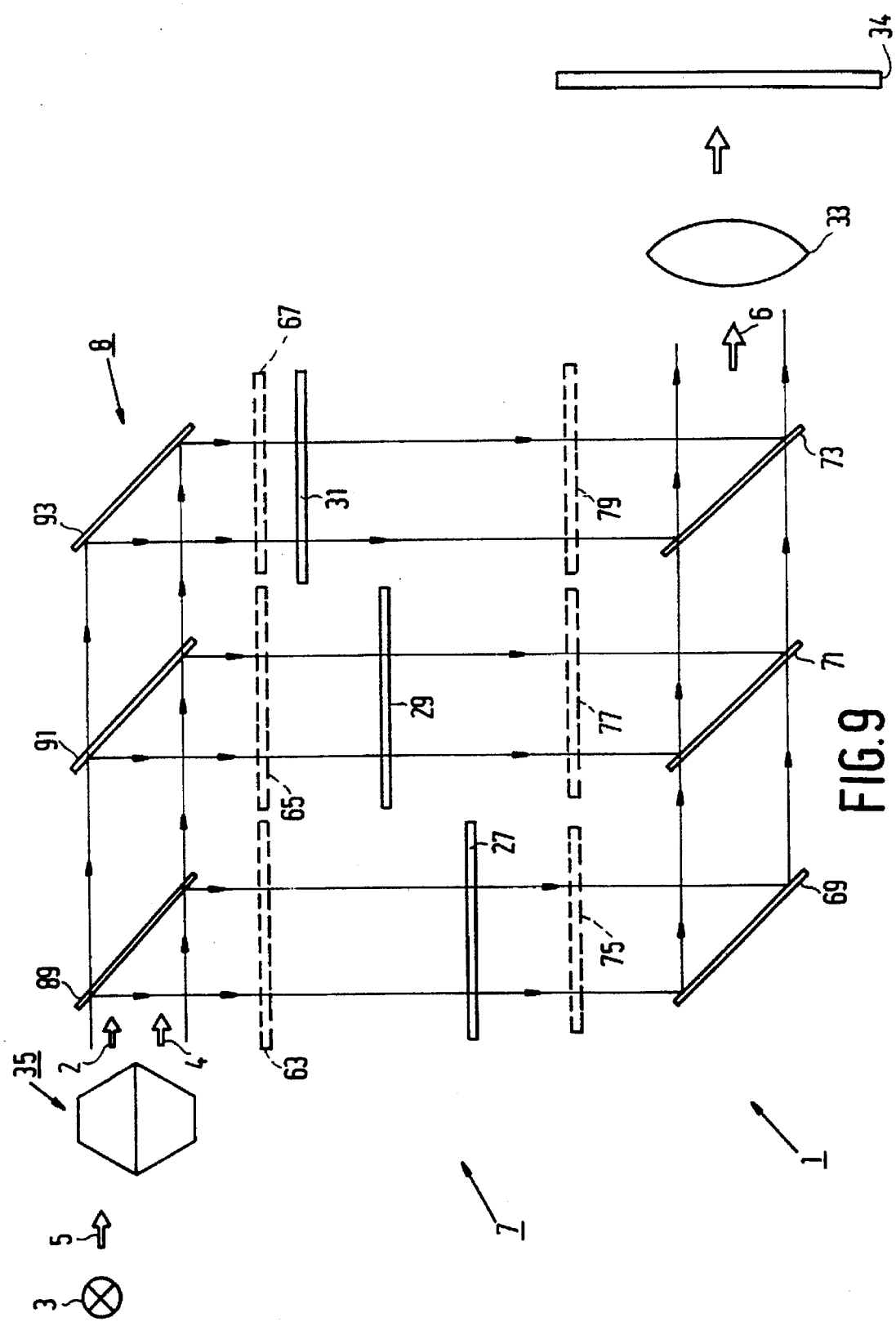
FIG. 9 shows diagrammatically an embodiment of a colour image projection device with a polarizer supplying two sub-beams circularly polarized in the same direction of rotation.

When the two sub-beams 2 and 4 are circularly polarized in the same direction, it will be sufficient to use a mirror system 8 comprising only three cholesteric mirrors 89, 91 and 93 instead of six, as is shown in FIG. 9.

By means of a combination of refractive index variation of the material of one of the two prisms and providing or not providing metallic layers on the reflection faces of the Fresnel prisms, a substantially symmetrical polarizer can be obtained which directly converts an unpolarized radiation beam into a circularly polarized radiation beam, within which beam there is only one circularly polarized direction of rotation.

Figure 10:
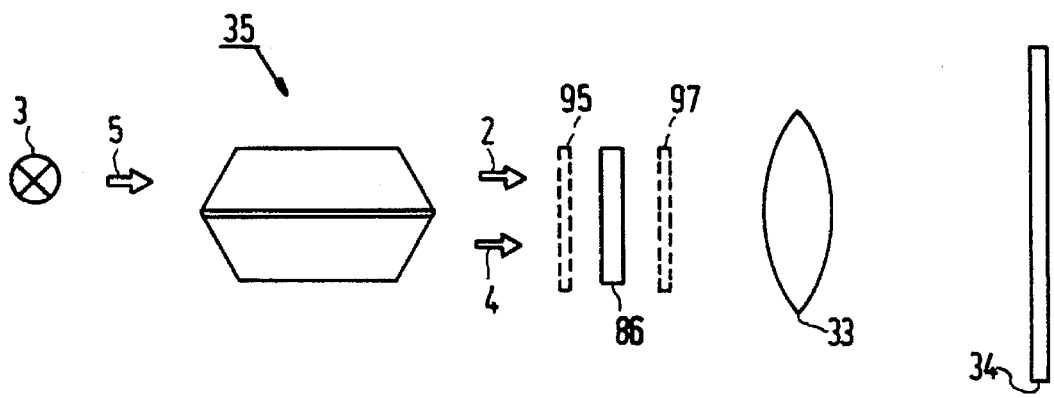
FIG. 10 shows diagrammatically an embodiment of a black-white or monochrome image projection device.

The circular polarizer according to the invention, notably in the embodiments providing two circularly polarized sub-beams having the same direction of rotation, may alternatively be used in black-white or monochrome image projection devices such as, for example monitors. FIG. 10 shows the principle of such a device.

The unpolarized radiation beam 5 emitted by the radiation source 3 is converted by the composite circular polarizer 35 into two circularly polarized sub-beams 2 and 4, either or not circularly polarized in the same direction of rotation, dependent on providing a polarization-rotating element on the polarizer 35. The radiation modulated by means of a black-white or a monochrome LCD panel 86 is subsequently projected on an image projection screen 34 via a projection lens system 33. When the LCD panel modulates linearly polarized light, a λ/4 plate 95, 97 is arranged in front of and behind the LCD panel, which λ/4 plate need not have a wide band if a monochrome LCD panel is used.

We claim:

1. An illumination system for a colour image projection device, successively comprising a radiation source for supplying a radiation beam of unpolarized radiation and at least a cholesteric mirror for splitting the radiation beam into at least two sub-beams, each sub-beam having a different wavelength, characterized in that a composite circular polarizer for directly converting the unpolarized radiation into circularly polarized sub-beams is arranged in the path of the radiation beam between the radiation source and the cholesteric mirror, said polarizer comprising a polarization-sensitive beam splitter for splitting the radiation beam into two mutually perpendicularly and linearly polarized sub-beams, and a polarization converter for converting the linearly polarized sub-beams into circularly polarized sub-beams, the circularly polarized sub-beams from the polarizer jointly forming one beam.

2. An illumination system as claimed in claim 1, characterized in that the polarization-sensitive beam splitter comprises two transparent elements between which a polarization-separating layer is present, and in that the polarization converter comprises two $\lambda/4$ plates each being arranged in a diagonal position on a different exit face of the polarization-sensitive beam splitter.

3. An illumination system as claimed in claim 1, characterized in that the polarization-sensitive beam splitter comprises two transparent elements between which a polarization-separating layer of liquid crystalline material is present, whose molecules are oriented on said layer at an azimuth angle of substantially 45° to the plane of incidence and at a tilt angle which is equal to the angle of incidence $\alpha$ of the unpolarized radiation beam, and in that the polarization converter comprises a third and a fourth transparent element each for guiding a linearly polarized sub-beam supplied by the beam splitter and each having at least a reflection face on which a phase shift occurs upon reflection of the relevant sub-beam between the sub-beam component having a direction of polarization parallel to the plane of incidence and the sub-beam component having a direction of polarization perpendicular to the plane of incidence, the total phase shift in both the third and the fourth element being 90°.

4. An illumination system as claimed in claim 3, characterized in that the third and the fourth element are Fresnel prisms each having a first reflection face and a second reflection face enclosing an angle $\beta_1$ and an angle $\beta_2$, respectively, with the polarization-separating layer, while it holds that:

$$tg\frac{\delta_1}{2} = \frac{\cos\theta_{i,1}\sqrt{\sin^2\theta_{i,1} - n^2}}{\sin^2\theta_{i,1}}$$

$$tg\frac{\delta_2}{2} = \frac{\cos\theta_{i,2}\sqrt{\sin^2\theta_{i,2} - n^2}}{\sin^2\theta_{i,2}}$$

with $\delta_1$ and $\delta_2$ being the phase shifts between the component having a direction of polarization parallel to the plane of incidence and the component having a direction of polarization perpendicular to the plane of incidence of the linearly polarized sub-beam entering the third and the fourth element, respectively, due to the total internal reflections on the respective reflection faces, n being the relative refractive index of the Fresnel prisms, $\theta_{i,1}=\alpha-\beta_1$ being the angle of incidence for the first total internal reflection and $\theta_{i,2}=\alpha-2\beta_1-\beta_2$ being the angle of incidence for the second total internal reflection, $\alpha$ being the angle of incidence of the unpolarized radiation beam on the polarization-separating layer of the beam splitter.

5. An illumination system as claimed in claim 4, characterized in that the first and the second transparent element are each integrated with a Fresnel prism to a single element.

6. An illumination system as claimed in claim 3, characterized in that at least the third or the fourth element has a reflecting layer on at least a reflection face.

7. An illumination system as claimed in claim 1, characterized in that one of the exit faces of the polarizer is provided with a polarization-rotating element.

8. An illumination system as claimed in claim 7, characterized in that the polarization-rotating element is a $\lambda/2$ plate.

9. An illumination system as claimed in claim 7, characterized in that the polarization-rotating element is a double Fresnel prism.

10. A circular polarizer for converting unpolarized radiation of a radiation beam into circularly polarized radiation in sub-beams, the polarizer comprising a polarization-sensitive beam splitter for splitting the radiation beam into two mutually perpendicularly and linearly polarized sub-beams, and a polarization converter for converting the linearly polarized sub-beams into circularly polarized sub-beams.

11. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 1.

12. A circular polarizer as claimed in claim 10, wherein the polarization-sensitive beam splitter comprises two transparent elements between which a polarization-separating layer is present.

13. A circular polarizer as claimed in claim 12, wherein the polarization converter comprises two $\lambda/4$ plates each being arranged in a diagonal position on a different exit face of the polarization-sensitive beam splitter.

14. A circular polarizer as claimed in claim 12, wherein the polarization-separating layer comprises liquid crystalline material, the material being molecularly oriented at an azimuth angle of substantially 45° to the plane of incidence and at a tilt angle which is equal to the angle of incidence $\alpha$ of the unpolarized radiation beam.

15. A circular polarizer as claimed in claim 14, wherein the polarization converter comprises a third transparent element and a fourth transparent element, said third and fourth transparent elements guiding a linearly polarized sub-beam supplied by the polarization-sensitive beam splitter and having at least a reflection face on which a phase shift occurs upon reflection of the relevant sub-beam between the sub-beam component having a direction of polarization parallel to the plane of incidence and the sub-beam component having a direction of polarization perpendicular to the plane of incidence, the total phase shift in both the third and fourth transparent elements being 90°.

16. A circular polarizer as claimed in claim 15 characterized in that the third and the fourth elements are Fresnel prisms each having a first reflection face and a second reflection face enclosing an angle $\beta_1$ and an angle $\beta_2$, respectively, with the polarization-separating layer, while it holds that:

$$tg\frac{\delta_1}{2} = \frac{\cos\theta_{i,1}\sqrt{\sin^2\theta_{i,1} - n^2}}{\sin^2\theta_{i,1}}$$

$$tg\frac{\delta_2}{2} = \frac{\cos\theta_{i,2}\sqrt{\sin^2\theta_{i,2} - n^2}}{\sin^2\theta_{i,2}}$$

with $\delta_1$ and $\delta_2$ being the phase shifts between the component having a direction of polarization parallel to the plane of incidence and the component having a direction of polarization perpendicular to the plane of incidence of the linearly polarized sub-beam entering the third and fourth element, respectively, due to the total internal reflections on the respective reflection faces, n being the relative refractive index of the Fresnel prisms, $\theta_{i,1}=\alpha-\beta_1$ being the angle of incidence for the first total internal reflection and $\theta_{i,2}=\alpha-2\beta_1-\beta_2$ being the angle of incidence for the second total internal reflection, $\alpha$ being the angle of incidence of the unmolarized radiation beam on the polarization-separating layer of the beam splitter.

17. A circular polarizer as claimed in claim 16, characterized in that the first and the second transparent elements are each integrated with a Fresnel prism to a single element.

18. A circular polarizer as claimed in claim 15, characterized in that a least one of the third or the fourth element has a reflecting layer on at least a reflection face.

19. A circular polarizer as claimed in claim 10, further comprising at least one exit face provided with a polarization-rotating element.

20. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 2.

21. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 3.

22. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 4.

23. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 5.

24. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 6.

25. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 7.

26. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 8.

27. An image projection device comprising an illumination system with a radiation source for supplying a radiation beam, an image display system comprising at least an image display panel for generating an image to be projected by modulation of the direction of polarization of the radiation beams, and a projection lens system for projecting the image formed by the image display system, characterized in that the illumination system is an illumination system as claimed in claim 9.

* * * * *